United States Patent [19]
Watanabe

[11] Patent Number: 5,115,302
[45] Date of Patent: May 19, 1992

[54] SOLID STATE COLOR IMAGING DEVICE

[75] Inventor: Takashi Watanabe, Soraku, Japan

[73] Assignee: Sharp Kabushiki Kaisha, Osaka, Japan

[21] Appl. No.: 687,322

[22] Filed: Apr. 18, 1991

[30] Foreign Application Priority Data

Apr. 26, 1990 [JP] Japan .................................. 2-111061
Feb. 26, 1991 [JP] Japan .................................. 3-30508

[51] Int. Cl.$^5$ .......................... H04N 9/04; H04N 9/07
[52] U.S. Cl. ...................................... 358/41; 358/43; 358/44
[58] Field of Search ............................ 358/41, 43, 44

[56] References Cited

U.S. PATENT DOCUMENTS 4,630,106 12/1986 Morimura ............................ 358/44
4,775,885 10/1988 Sato ...................................... 358/44
4,845,548  7/1989 Kohno .................................. 358/44

FOREIGN PATENT DOCUMENTS 0133783 6/1988 Japan .

Primary Examiner—Howard W. Britton
Assistant Examiner—Sherrie Hsia
Attorney, Agent, or Firm—David G. Conlin; Robert M. Asher

[57] ABSTRACT

The present invention is directed to an arrangement of the color filters of a solid state imaging device for the frame storing operation, two of the four color filters F1, F2, F3 and F4 having the different spectral characteristics from each other are selected and laminated, wherein F1*F2 and F3*F4 are alternately arranged in a horizontal direction, while F2*F3 and F1*F4 are alternately arranged in the horizontal direction while being spaced one horizontal scanning period away from the former line so that the visible spectral characteristics of the three color filters are agreed in each region of the spectral band of the received light, and the combination of the three color filters is different for each region.

1 Claim, 7 Drawing Sheets

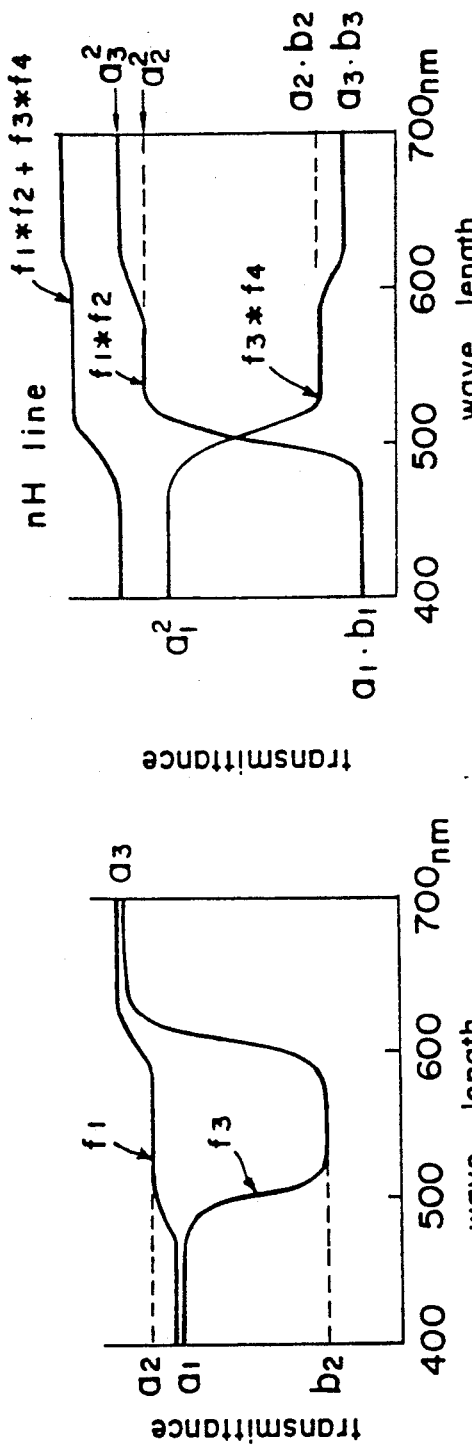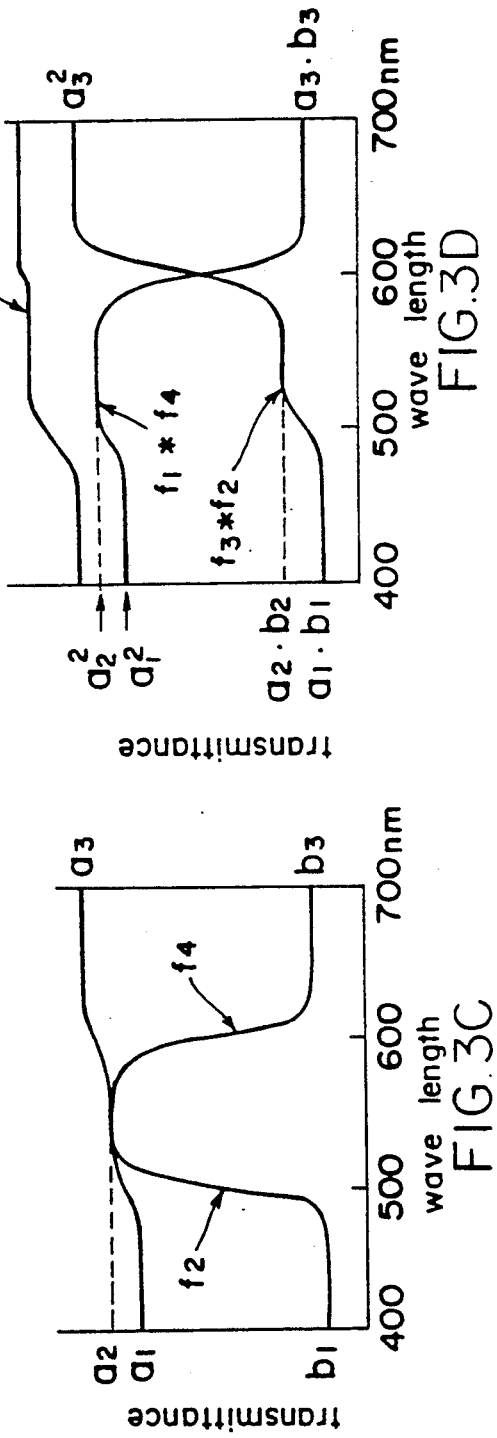

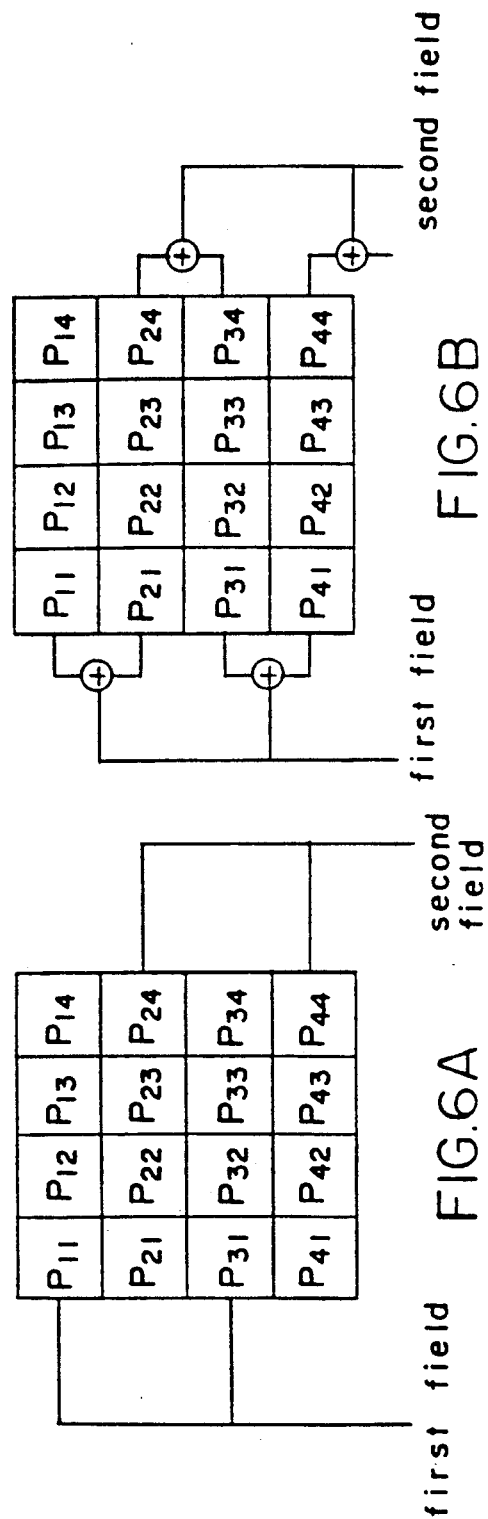

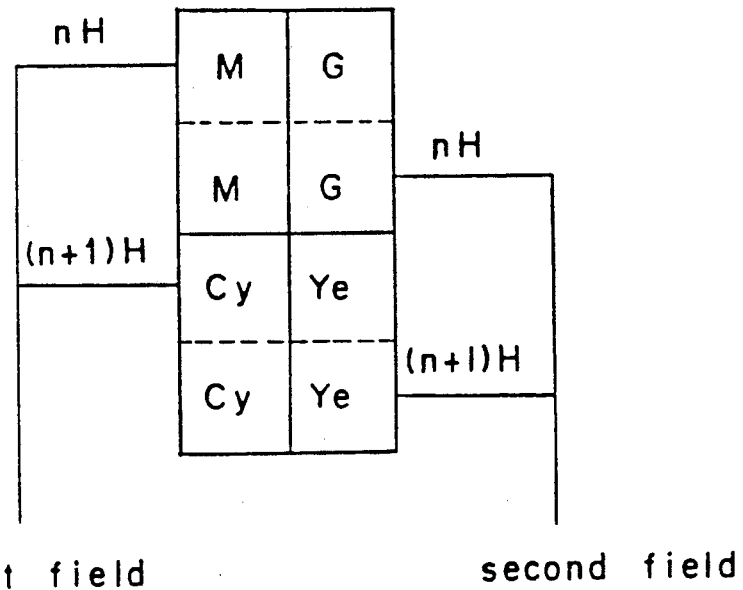
FIG.7   first field   second field
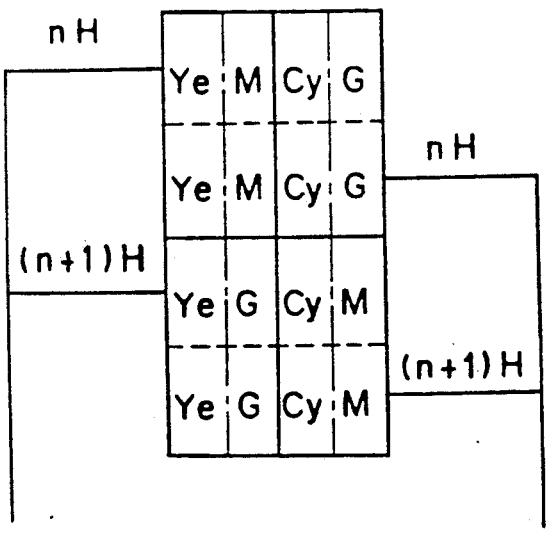
FIG.8   first field   second field

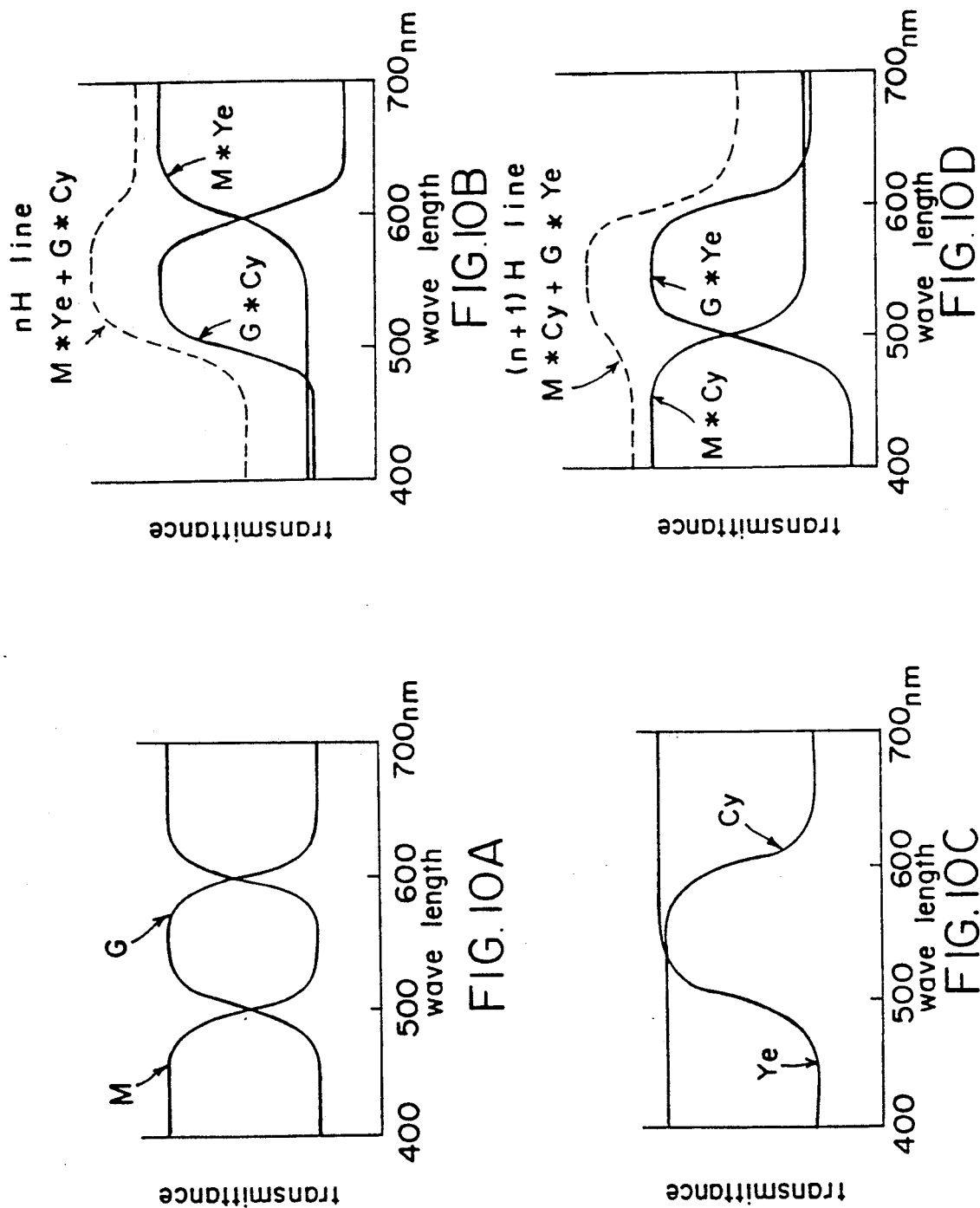

SOLID STATE COLOR IMAGING DEVICE

BACKGROUND OF THE INVENTION

1. Field of the Invention

The present invention relates to a color solid state imaging device using a plurality of color filters.

2. Description of the Prior Art

A two-dimensional solid state imaging device consists of pixels regularly arranged in a horizontal and a vertical directions and, a reading part which reads signal charges after photoelectric conversion stored in the pixels. When the reading part of this two-dimensional solid state imaging device is a CCD (charge-coupled device), the device is called as a CCD type imaging device, while, when the reading part is a MOS scanning circuit, the imaging device is called as a MOS transistor type imaging device. In any type of the device, the signal charges stored in the pixels are read out by two kinds of operations, namely, frame storing operation whereby the signal charges are read out per a frame period as shown in FIG. 6(a) and field storing operation whereby the signal charges are read out per a field period as shown in FIG. 6(b). Since the field storing operation requires half the storage time necessary for the frame storing operation, it is suitable for use in a video movie, etc. to pick up a continuous moving picture. Nevertheless, the field storing operation is not applicable to a still camera or the like obtaining an image of one frame by one shot and therefore, the frame storing operation in combination with an optical shutter is inevitably required for the field storing operation to be used for the above-mentioned usage, i.e., still camera or the like. The frame storing operation is high in vertical resolution without mixing the two pixels in the vertical direction.

Meanwhile, as for single-device coloration in the frame storing operation, a sequential color system among many systems proposed is considered superior because of the following three characteristic features thereof;

(1) the system does not use vertical correlation to obtain luminance signals, thereby realizing high vertical resolution;

(2) color signals are not generated when an object of achromatic color is picked up, so that the generation of a spurious color is restricted; and (3) the transmittance is high for complementary colors and the sensitivity is good.

An example of the conventional color solid state imaging device of the above-described type is constructed in such an arrangement of color filters as shown in FIG. 7. In FIG. 7, M,G,Cy and Ye represent a magenta filter, a green filter, a cyan filter and a yellow filter, respectively. According to this arrangement of color filters, a magenta color signal (referred to as M hereinbelow)+a green color signal (referred to as G hereinbelow) is obtained in an nH line, while a yellow color signal (referred to as Ye hereinbelow)+a cyan color signal (referred to as Cy hereinbelow) is obtained in an (n+1)H line, for the luminance signals. On the other hand, for the color difference signals, M-G=a red color signal (referred to as R hereinbelow)+a blue color signal (referred to as B hereinbelow)-a green color signal (referred to as G hereinbelow) is obtained in the nH line, and Ye-Cy=R-B is obtained in the (n+1)H line. The above color difference signals M-G and Ye-Cy are alternately obtained per every one horizontal scanning period (referred to as 1H hereinbelow). When an achromatic object is picked up by the color solid state imaging device, if M-G=Ye-Cy=0 is held, it is possible to control the generation of the spurious color.

In another example of the conventional solid state color imaging device, color filters are arranged in such a fashion as shown in FIG. 8. In FIG. 8, M,G,Cy and Ye represent a magenta filter, a green filter, a cyan filter and a yellow filter, respectively. The luminance signal according to this arrangement of the color filters is ½(M+G+Ye+Cy) both in the nH line and (n+1)H line. Moreover, two color difference signals ½(Ye+M-Cy-G)=R-G/2 and ½(Cy+M-Ye-G)=B-G/2 are alternately obtained per every 1H. When an achromatic object is picked up by the conventional apparatus of the second example, if R-G/2=B-G/2=0 is satisfied, it is possible to restrict the spurious color.

In the meantime, it is necessary for the color solid state imaging device that the luminance signals are agreed with each other with good accuracy all over the color region in every horizontal line whichever color the object to be picked up has. Otherwise, striped patterns would be produced per a scanning line on the picked-up image, resulting in the considerable deterioration of the image quality.

In contrast to the above-mentioned necessity, however, the luminance signal M+G in the nH line and that Ye+Cy in the (n+1)H line are respectively the sum of the color signals different from each other in the conventional color solid state imaging device of FIG. 7, and therefore it is considerably difficult to agree the former with the latter all over the color band region.

According to the conventional second example shown in FIG. 8, the luminance signals are the same ½(M+G+Ye+Cy) in all of the horizontal lines, without generating no striped patterns per a scanning line. However, in order to arrange the color filters as in the second example, the light receiving area of a pixel of several μm should be divided in half correctly with the accuracy of approximately 1/10 μm to arrange two color filters of different colors. To maintain this arranging accuracy for the whole of the horizontal and vertical 100 pixels is extraordinarily hard. Particularly, if the color filters are formed directly on the light receiving surface of the reading part of the solid state imaging device, it is nearly impossible to maintain the accuracy.

For counterbalancing the aforementioned difficulties in maintaining the manufacturing accuracy, it may be possible to arrange two different color filters for one pixel up and down as illustrated in FIGS. 9(a) and 9(b). More specifically, referring to FIG. 9 wherein Ye,M,Cy and G represent a yellow filer, a magenta filter, a cyan filter and a green filter, a color signal passing to the light receiving part is M*Ye or G*Cy in the nH line, and M*Cy or G+Ye in the (n+1)H line, * being an operator to calculate the product of the color signals passing through the two color filters. Therefore, the luminance signal according to the arrangement of the color filters as shown in FIG. 9 is M*Ye+G*Cy in the nH line, and M*Cy+G*Ye in the (n+1)H line.

The above two luminance signals have the spectral characteristics shown by a broken line in FIGS. 10(c) and 10(d) after the spectral characteristics of M,G,Ye and Cy shown in FIGS. 10(a) and 10(b) are added and multiplied, respectively. As is clear from FIGS. 10(c) and (d), not only the spectral characteristic of the luminance signal M*Ye+G*Cy in the nH line is not agreed with that of the luminance signal M*Cy+G*Ye in the (n+1)H line except in the green band region, but the size of the output signals is reversed in the blue and red band regions. Since this disagreement is impossible to be electrically corrected in spite of that it may be possible to be electrically corrected in the case of spectral compositions having symmetrical shape being arranged in getting out of position, it still remains hard to restrict the generation of the striped patterns in every scanning line.

SUMMARY OF THE INVENTION

An object of the present invention is to provide a color solid state imaging device easy to manufacture, wherein the level of luminance signals is agreed with each other in the horizontal lines.

In accomplishing the above-described object, according to the present invention, a color solid state imaging device is provided wherein a first horizontal line having a pixel with a first color filter and a second color filter laminated thereon and a pixel with a third color filter and a fourth color filter laminated thereon arranged alternately in a horizontal direction, and a second horizontal line having a pixel with the first and fourth color filters laminated thereon and a pixel with the third and second color filters laminated thereon arranged alternately in the horizontal direction are alternately arranged in a vertical direction, while being spaced one horizontal scanning period therebetween. When the visible spectral band of the received light is divided into three or more color band regions, the spectral characteristics of the three color filters among the above four color filters are agreed with each other in any of the above-divided color band regions. At the same time, the combination of the three color filters of the same spectral characteristics is different for each of the above-divided color band region. Moreover, the spectral characteristics of the four color filters are different from each other in the visible whole spectral band.

Now, assuming that the spectral characteristics of the first, second, third and fourth color filters are designated by $F1(g)$, $F2(g)$, $F3(g)$ and $F4(g)$, respectively, and the spectral characteristic of the imaging system except the color filters is expressed by $A(g)$, g being the wavelength of the light, the spectral characteristic of the luminance signal obtained in the first horizontal line is represented by $\{F1(g)*F2(g)+F3(g)*F4(g)\}.A(g)$. On the other hand, the spectral characteristic of the luminance signal obtained in the second horizontal line is expressed by $\{F1(g)*F4(g)+F3(g)*F2(g)\}.A(g)$. It is necessary to satisfy the following equation (1) so that the spectral characteristic of the luminance signal of the first horizontal line is agreed with that of the luminance signal of the second horizontal line;

$$F1(g)*F2(g)+F3(g)*F4(g)=F1(g)*F4(g)+F3(g)*F2(g) \quad (1)$$

Supposed that $F1(g)=F4(g)$ is held, the equation (1) can be changed to;

$$F1^2(g)-\{F2(g)+F3(g)\}*F1(g)+F2(g)*F3(g)=0,$$

and further to;

$$\{F1(g)-F2(g)\}*\{F1(g)-F3(g)\}=0.$$

Accordingly, when $F1(g)=F4(g)$, the equation (1) is held if $F1(g)=F2(g)$ or $F1(g)=F3(g)$ is satisfied. In other words, the equation (1) is held if at least three of the four spectral characteristics $F1(\lambda)$, $F2(\lambda)$, $F3(\lambda)$ and $F4(\lambda)$ are agreed.

Meanwhile, according to the present invention, since the three of the four spectral characteristics are agreed in any of the divided color band regions constituting the visible spectral band of the received light, the equation (1) is held and the luminance signals in the first and second horizontal lines are agreed with each other to any arbitrary color light obtained in the combination of the above divided color band regions. Therefore, the level of the luminance signals is equal in each horizontal line. Moreover, since the spectral characteristics $F1(\lambda)$, $F2(\lambda)$, $F3(\lambda)$ and $F4(\lambda)$ are different from each other in the visible whole of the spectral band, the color difference signal obtained in the first horizontal line, i.e., $\{F1(\lambda)*F2(\lambda)-F3(\lambda)*F4(\lambda)\}.A(\lambda)$ is not agreed with the color difference signal obtained in the second horizontal line, namely, $\{F1(1)*F4(\lambda)-F3(\lambda)*F2(\lambda)\}.A(\lambda)$. Accordingly, it becomes possible to receive the two color difference signals separately as an independent signal alternately for every 1H.

BRIEF DESCRIPTION OF THE DRAWINGS

This and other objects and features of the present invention will become apparent from the following description taken in conjunction with preferred embodiments thereof with reference to the accompanying drawings, in which:

FIGS. 3a-3d show spectral characteristic curves of the apparatus of FIG. 1;

FIG. 5 is a diagram of a solid state color imaging device according to a still further embodiment of the present invention;

FIGS. 6a and 6b are explanatory of the reading method of signals;

FIG. 7 is a diagram of a first example of a conventional solid state color imaging device;

FIG. 8 is a diagram of a second example of a conventional solid state color imaging device;

FIGS. 10a-10d show spectral characteristic curves of the device of FIGS. 9a and 9b.

DETAILED DESCRIPTION OF PREFERRED EMBODIMENTS

Figure 1:
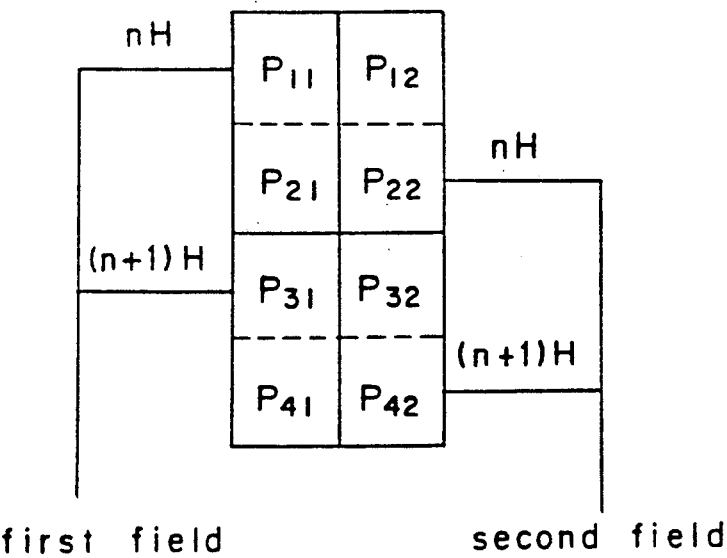
FIG. 1 is a diagram of a solid state color imaging device according to one embodiment of the present invention.

Before the description of the present invention proceeds, it is to be noted here that like parts are designated by like reference numerals throughout the accompanying drawings.

Figure 2A:
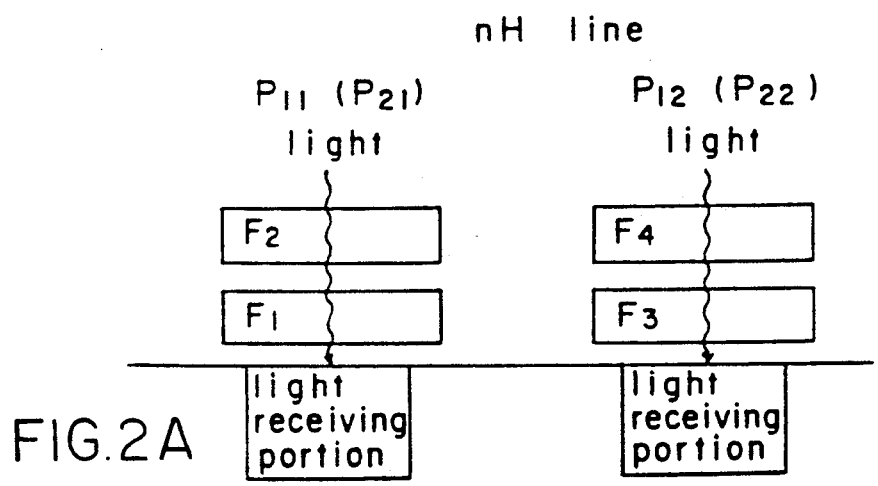
FIGS. 2a and 2b are cross sectional view of the apparatus of FIG. 1 showing the arrangement of color filters.
Figure 2B:
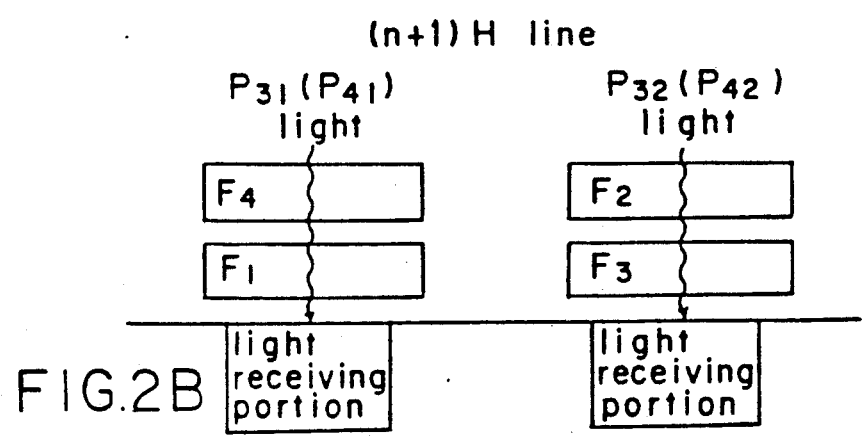
Figure 4A:
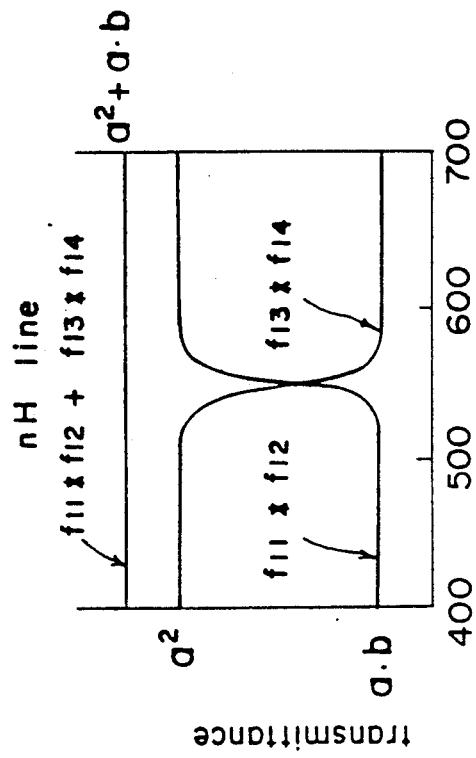
FIGS. 4a-4d show spectral characteristic curves of a solid state color imaging device according to a further embodiment of the present invention.
Figure 4B:
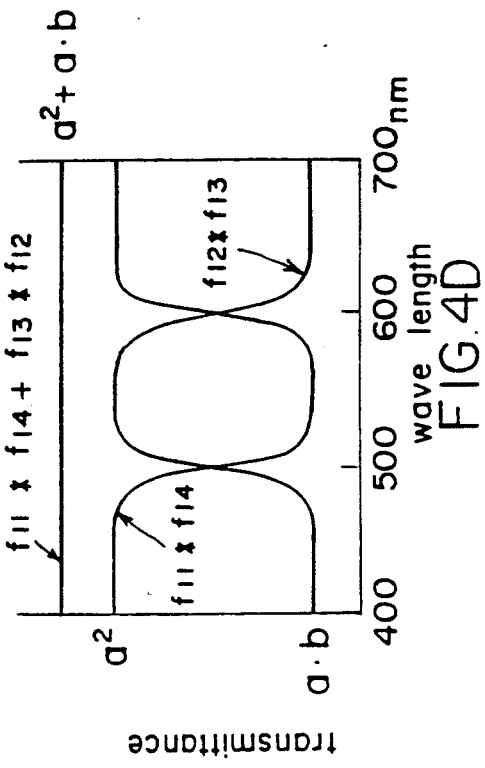
Figure 4C:
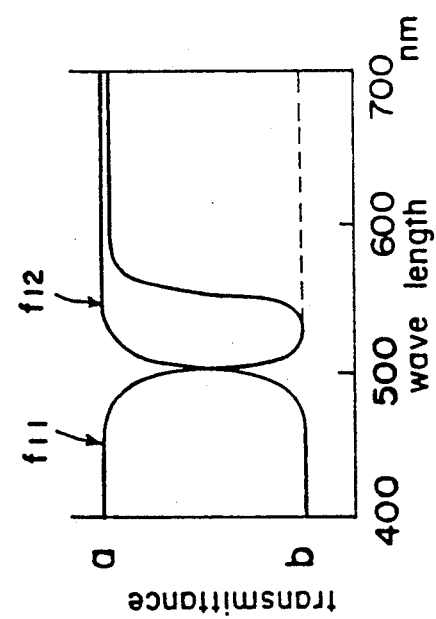
Figure 4D:
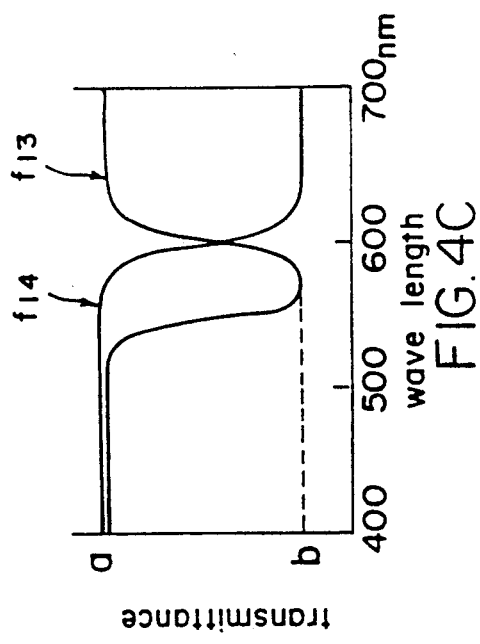
Figure 9A:
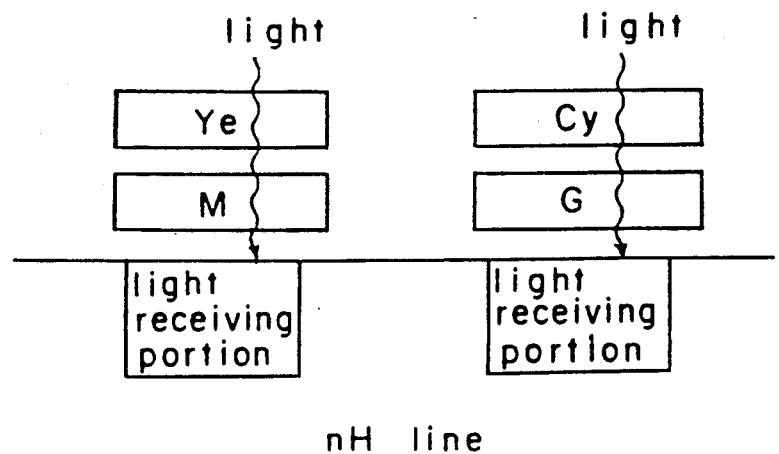
FIGS. 9a and 9b are cross sectional views of a solid state color imaging device in an arrangement when two color filters are laminated.
Figure 9B:
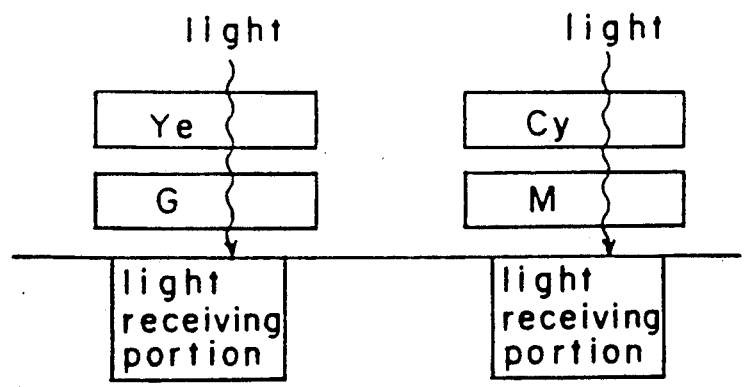

FIG. 1 shows a plane view of eight pixels, specifically, two pixels in every horizontal line and four pixels in every vertical line, arranged as one array in a color solid state imaging device according to a preferred embodiment of the present invention. FIG. 2(a) is a cross section of FIG. 1 in an nH line, while FIG. 2(b) is a cross section of FIG. 1 in an (n+1)H line. As mentioned above, the eight pixels are rendered a unit in the arrangement of the present embodiment. The signal charges stored in the eight pixels are read out per a frame period, that is, the frame storing operation is performed in the present embodiment. Two kinds of color filters are laminated in each pixel in a direction of the incident light. In other words, a color filter of a pixel P11 or a pixel P21 in each nH line of a first and a second fields is obtained by laminating a first color filter F1 and a second color filter F2. A color filter of a pixel P12 or P22 there is obtained by laminating a third color filter F3 and a fourth color filter F4. The pixels P11,P21 are repeatedly arranged alternately to the pixels P12,P22 in the horizontal direction. On the other hand, a color filter of a pixel P31 or P41 in each (n+1)H line of the first and second fields which is spaced one horizontal scanning period from the nH line is obtained, as illustrated in FIG. 2(b), by laminating the first color filter (referred to as F1 hereinbelow) and the fourth color filter F4 (referred to as F4 hereinbelow), whereas a color filter of a pixel P32 or P42 is obtained by laminating the third color filter F3 (referred to as F3 hereinbelow) and the second color filter F2 (referred to as F2 hereinbelow). The pixels P31,P41 are repeatedly arranged alternately to the pixels P32,P42 in the horizontal direction.

In other words, the color filter in the nH line has its upper color filters F2 or F4 replaced with the color filters F4 or F2 of the color filter in the (n+1)H line. FIGS. 3(a) and 3(c) show curves of spectral characteristics f1, f2, f3 and f4 of the color filters F1, F2, F3 and F4, respectively, in the wavelength 400-700 nm of a visible light. As is clear from the graphs, f1 shows the spectral characteristic of a filter allowing all colors to pass through, f2 showing the spectral characteristic of a filter absorbing a blue color, f3 showing the spectral characteristic of a filter absorbing a green color and f4 showing the spectral characteristic of a filter absorbing a red color. In the blue band region (400-500 nm), the spectral characteristics f1, f3 and f4 are agreed at the same transmittance a1 of the passing band region. Moreover, in the green band region (500-600 nm), the spectral characteristics f1, f2 and f4 are agreed at the same transmittance a2 of the passing band region. Further, in the red band region (600-700 nm), the spectral characteristics f1, f2 and f3 are agreed at the same transmittance a3 of the passing band region. That is, the spectral characteristics of the three color filters are agreed in the above three color band regions, and at the same time, the combination of the three color filters when the spectral characteristics are agreed with each other is different in each color band region. The transmittances of the absorbing band region of F2, F3 and F4 are b1, b2 and b3, respectively, which are not equal.

In the structure as depicted hereinabove, the relative luminance signal obtainable from the nH line which is a signal obtained by dividing a luminance signal by the spectral characteristic of the imaging system is the sum of the product of the spectral characteristics of F1 and F2 and the product of the spectral characteristics of F3 and F4. On the other hand, the relative luminance signal obtained from the (n+1)H line is the sum of the product of the spectral characteristics of F1 and F4 and the product of the spectral characteristics of F3 and F2. Therefore, the components (blue band region, green band region and red band region) of the relative luminance signal from the nH line and that from the (n+1)H line are both expressed, as shown in FIGS. 3(b) and 3(d), by (a1$^2$+a1.b1, a2$^2$+a2.b2, a3$^2$+a3.b3) Accordingly, the relative luminance signals in all the horizontal lines are agreed with each other, and the luminance signals are all agreed, without generating striped patterns per a scanning line on the picked-up image.

Meantime, the relative color difference signal from the nH line is expressed by (a1.(a1-b1), -a2.(a2-b2), -a3.(a3-b3)). The relative color difference signal from the (n+1)H line is (-a1.(a1-b1), -a2.(a2-b2), a3.(a3-b3)). The relative color difference signals are not agreed between the nH line and (n+1)H line, but independent of each other.

The spectral characteristic of each color filter according to a further embodiment of the present invention is indicated in FIG. 4. Since the structure of the color filters used in the further embodiment is the same as in the foregoing embodiment shown in FIG. 1 except the spectral characteristics of the color filters shown in FIGS. 4(a) and 4(c), the detailed description thereof will be abbreviated here and only the spectral characteristics will be depicted hereinafter.

Referring to FIG. 4, f11 indicates the spectral characteristic of a first color filter absorbing the short waves of the green light, f12 showing the spectral characteristic of a second color filter absorbing the blue light, f13 showing the spectral characteristic of a third color filter absorbing the long waves of the green light and f14 showing the spectral characteristic of a fourth filter absorbing the red light. f11, f13 and f14 are agreed at the same transmittance a of the passing band region in the blue band region, and f12, f13 and f14 are agreed at the short wave side of the green band region. Moreover, f11, f12 and f14 are agreed at the long wave side of the green band region. f11, 12 and f13 are agreed in the red band region. It is to be noted here that for brevity of the explanation, the transmittance of all the filters is set to be a at the higher side and b at the lower side in the above four color band regions.

That is, in the four color band regions, not only the spectral characteristics of the three color filters are agreed, but the combination of the three color filters when the spectral characteristics are agreed is different for each color band region. The relative luminance signal obtainable from the nH line is the sum of the products of f11 and f12, and f13 and 14. The relative luminance signal obtainable from the (n+1)H line is the sum of the products of f11 and f14, and f13 and f12. Therefore, as is clear from FIGS. 4(b) and 4(d), the relative luminance signal from the nH line is equal to that from the (n+1)H line, i.e., a$^2$+a.b in all of the color band regions. Accordingly, the relative luminance signals are agreed in all the horizontal lines and the luminance signals are agreed, whereby no striped patterns are generated on the picked-up image.

The relative color difference signal from the nH line is (a$^2$-a.b).(R-B), and that from the (n+1)H line is (a$^2$-a.b).(R+B-G). Therefore, the relative color difference signals from the nH line and (n+1)H line are not agreed, and independent of each other. Since the spectral characteristic A(g) of the imaging system is large in the green signal area and small in the red and blue signal areas, it is easy to make both the color difference signal from the nH line, namely, (a$^2$-a.b).(R-B).A(g) and the color difference signal from the (n+1)H line, that is, (a$^2$-a.b).(R+B-G).A(g) to be 0, thereby remarkably restricting the generation of spurious color signals.

Although the upper color filters are exchanged between the nH line and (n+1)H line in the preceding two embodiments, the lower color filters may be exchanged. Besides, the color filters in the first field may be shifted by the distance of one horizontal pixel to the color filters of the second field although they are arranged in the same array in the preceding two embodiments.

Moreover, although the foregoing description is related to the frame storing operation of the solid state imaging device in combination with the optical shutter, it is apparent that the present invention is applicable to a device without having an optical shutter which reads all the pixels independently from each other in one field of full-frame readout mode. In this case, the non-interlaced, sequential scanning system or system equivalent to this is employed. The color filters are arranged in a manner as shown in FIG. 5. That is, the pixels only in one field of FIG. 1 are taken out and arranged in the horizontal and vertical directions by a unit of 2×2 pixels (F1*F2, F3*F4, F1*F4, F3*F2). Particularly in the vertical direction, the number of pixels is set so as to form a full frame. The structure, spectral characteristic, and processing method of signals of each color filter according to this embodiment are totally the same as described with reference to FIGS. 1 and 2, and therefore the description related to FIGS. 3 and 4 can be applied here. The relative luminance signals in the two horizontal lines as a unit to form the image are agreed with each other, while the relative color difference signals in the horizontal lines are not agreed and two independent signals appear alternately for every 1H. Although the aforementioned full-frame readout device can obtain the vertical resolution of the number of the vertical pixels by one reading operation, and no such arrangement of the color filters that enables a single full-frame readout device to obtain full color signals with high resolution has been contrived yet, this embodiment can achieve the device.

As is fully described hereinabove, in the color solid state imaging device of the present invention, a first horizontal line which has a pixel laminated with the first and second color filters and a pixel laminated with the third and fourth color filters arranged alternately in the horizontal direction is provided in a vertical direction alternately to a second horizontal line which has a pixel laminated with the first and fourth color filters and a pixel laminated with the third and second color filters arranged alternately in the horizontal direction, with one horizontal scanning period spaced therebetween. When the visible spectral band of the received light is divided into three or more color band regions, the spectral characteristics of the three of the four color filters are agreed with each other in any of the divided color band regions. Furthermore, the combination of the three color filters having the same spectral characteristics is different in each color band region. Therefore, the spectral characteristic of the luminance signal in the first horizontal line is agreed with that of the luminance signal of the second horizontal line, thereby generating no striped patterns per a scanning line on the picked-up image. At the same time, since the conventional difficult procedure to divide the light receiving area of the pixel into two to arrange the two color filters can be omitted, the color solid state imaging device can be produced at low cost with ease.

What is claimed is:

1. A color solid state imaging device comprising a first horizontal line having a pixel laminated with a first and a second color filters and a pixel laminated with a third and a fourth color filters arranged alternately in a horizontal direction, and a second horizontal line having a pixel laminated with said first and fourth color filters and a pixel laminated with said third and second color filters arranged alternately in the horizontal direction, said first horizontal line being arranged alternately in a vertical direction to said second horizontal line with one horizontal scanning period spaced therebetween, the spectral characteristics of three of said four color filters being agreed in any of the three or more color band regions divided from the visible spectral band of the received light, and the combination of said three color filters having the same spectral characteristics being different for each of said color band regions, while the spectral characteristics of said four color filters are different from each other in the whole of said visible spectral band of the received light.

* * * * *